(12) United States Patent
Nishimura et al.

(10) Patent No.: US 12,018,956 B2
(45) Date of Patent: Jun. 25, 2024

(54) DEVICE, METHOD, AND PROGRAM FOR PREDICTING DESTINATION

(71) Applicant: NIPPON TELEGRAPH AND TELEPHONE CORPORATION, Tokyo (JP)

(72) Inventors: Takuya Nishimura, Tokyo (JP); Hiroyuki Toda, Tokyo (JP); Yasuhito Yoshida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 304 days.

(21) Appl. No.: 17/421,347

(22) PCT Filed: Dec. 26, 2019

(86) PCT No.: PCT/JP2019/051266
§ 371 (c)(1),
(2) Date: Jul. 7, 2021

(87) PCT Pub. No.: WO2020/145187
PCT Pub. Date: Jul. 16, 2020

(65) Prior Publication Data
US 2022/0065646 A1 Mar. 3, 2022

(30) Foreign Application Priority Data
Jan. 9, 2019 (JP) .................... 2019-001825

(51) Int. Cl.
*G01C 21/34* (2006.01)
*G01C 21/36* (2006.01)
*G06N 20/00* (2019.01)

(52) U.S. Cl.
CPC ........ *G01C 21/3484* (2013.01); *G06N 20/00* (2019.01)

(58) Field of Classification Search
CPC ........... G01C 21/3484; G01C 21/3617; G06N 20/00; G06F 16/00; G06F 16/29; G06F 16/909
(Continued)

(56) References Cited

U.S. PATENT DOCUMENTS

| 5,919,246 A * | 7/1999 | Waizmann ......... G01C 21/3617 340/995.19 |
| 6,256,579 B1 * | 7/2001 | Tanimoto ........... G01C 21/3484 701/425 |

(Continued)

FOREIGN PATENT DOCUMENTS

| JP | 2005283575 A | 10/2005 |
| JP | 2017126179 A | 7/2017 |

OTHER PUBLICATIONS

Takimoto et al. (2017) "Time-Aware Personalized Destination Prediction" IEICE Transactions D, vol. J100-D, No. 4, pp. 472-484.
(Continued)

*Primary Examiner* — Jaime Figueroa

(57) ABSTRACT

A personal remaining movement estimation unit (12) estimates information relating to a remaining movement of a user on the move based on a movement trajectory of the user on the move, a personal destination estimation unit (16) predicts a destination of the user on the move based on information estimated by the personal remaining movement estimation unit (12) and information indicating the number of people moving between areas of a plurality of users stored in a movement trend information storage unit (34), and it is thereby possible to predict a destination even for a user having no information on past movement trajectories.

15 Claims, 16 Drawing Sheets

(58) Field of Classification Search
USPC .................................................. 701/1, 424
See application file for complete search history.

(56) References Cited

U.S. PATENT DOCUMENTS

| | | | | |
|---|---|---|---|---|
| 6,317,686 | B1* | 11/2001 | Ran | G08G 1/0141 |
| | | | | 73/178 R |
| 7,487,918 | B2* | 2/2009 | Kudo | G08G 1/096888 |
| | | | | 235/472.01 |
| 7,630,828 | B2* | 12/2009 | Tajima | G08G 1/096844 |
| | | | | 340/995.13 |
| 7,788,208 | B2* | 8/2010 | Kobayashi | G06N 7/01 |
| | | | | 706/52 |
| 8,527,514 | B2* | 9/2013 | Sakuma | G06F 16/29 |
| | | | | 707/751 |
| 8,533,726 | B2* | 9/2013 | Nishihara | B60W 40/02 |
| | | | | 718/104 |
| 8,754,777 | B1* | 6/2014 | Mendis | G01C 21/3617 |
| | | | | 701/410 |
| 9,219,668 | B2* | 12/2015 | Johnson | H04W 4/21 |
| 9,347,787 | B2* | 5/2016 | Moore | G01C 21/3617 |
| 9,500,492 | B2* | 11/2016 | Moore | G01C 21/367 |
| 9,618,343 | B2* | 4/2017 | Kahn | G06N 5/04 |
| 9,648,463 | B2* | 5/2017 | Seyde | G06Q 30/0261 |
| 9,976,864 | B2* | 5/2018 | Kahn | G01C 21/3617 |
| 10,113,879 | B2* | 10/2018 | Moore | G01C 21/3617 |
| 10,234,300 | B2* | 3/2019 | Martyniv | G01C 21/34 |
| 10,366,613 | B2* | 7/2019 | Yanagihara | G08G 1/096861 |
| 10,458,806 | B2* | 10/2019 | Chen | G01C 21/3484 |
| 10,578,451 | B2* | 3/2020 | Panahandeh | G01C 21/3484 |
| 10,907,983 | B1* | 2/2021 | Singh | G08G 1/09685 |
| 11,107,101 | B2* | 8/2021 | Zhang | G06Q 50/30 |
| 11,378,411 | B2* | 7/2022 | Panahandeh | G01C 21/3617 |
| 11,650,071 | B2* | 5/2023 | Chhajer | G06F 3/1462 |
| | | | | 701/409 |
| 2002/0120396 | A1* | 8/2002 | Boies | G06Q 10/047 |
| | | | | 340/995.19 |
| 2002/0143490 | A1* | 10/2002 | Maeda | G06F 16/29 |
| | | | | 702/150 |
| 2002/0161517 | A1* | 10/2002 | Yano | G01C 21/3407 |
| | | | | 340/990 |
| 2003/0225668 | A1* | 12/2003 | Goto | G06Q 30/06 |
| | | | | 705/37 |
| 2005/0251325 | A1* | 11/2005 | Kudo | G01C 21/3484 |
| | | | | 235/472.01 |
| 2007/0073477 | A1* | 3/2007 | Krumm | G01C 21/3617 |
| | | | | 701/423 |
| 2010/0106603 | A1* | 4/2010 | Dey | G08G 1/096888 |
| | | | | 705/14.63 |
| 2011/0117537 | A1* | 5/2011 | Funada | G06F 11/3476 |
| | | | | 434/365 |
| 2011/0313957 | A1* | 12/2011 | Ide | G01C 21/3617 |
| | | | | 706/12 |
| 2014/0052373 | A1* | 2/2014 | Hoch | G08G 1/096866 |
| | | | | 701/533 |
| 2015/0168150 | A1* | 6/2015 | Kahn | G01C 21/3617 |
| | | | | 701/538 |
| 2015/0253144 | A1* | 9/2015 | Rau | G01C 21/343 |
| | | | | 705/348 |
| 2015/0354978 | A1* | 12/2015 | Gerlach | G08G 1/096838 |
| | | | | 701/424 |
| 2017/0032421 | A1* | 2/2017 | Semple | G06Q 30/02 |
| 2017/0191845 | A1* | 7/2017 | Marueli | G01C 21/20 |
| 2017/0200374 | A1 | 7/2017 | Yanagihara et al. | |
| 2018/0023971 | A1* | 1/2018 | König | G01C 21/3492 |
| | | | | 701/533 |
| 2019/0107414 | A1* | 4/2019 | Jin | G06F 16/951 |
| 2019/0145779 | A1* | 5/2019 | Li | G01C 21/20 |
| | | | | 701/423 |
| 2019/0178665 | A1* | 6/2019 | Sakaida | G01C 21/3484 |
| 2020/0107163 | A1* | 4/2020 | Li | G06Q 10/04 |
| 2020/0182637 | A1* | 6/2020 | Kumar | G01C 21/343 |
| 2020/0284594 | A1* | 9/2020 | Wang | G08G 1/0112 |
| 2020/0408552 | A1* | 12/2020 | Yuan | G01C 21/3807 |

OTHER PUBLICATIONS

Endo et al. (2017) "Predicting Destinations from Partial Trajectories Using Recurrent Neural Network" The Pacific-Asia Conference on Knowledge Discovery and Data Mining(PAKDD 2017), Lecture Notes in Computer Science, May 23, 2017.

Xue et al. (2013) "Destination Prediction by Sub-Trajectory Synthesis and Privacy Protection Against Such Prediction" 2013 29th IEEE International Conference on Data Engineering( ICDE 2013), Apr. 8, 2013.

* cited by examiner

Fig. 3

| USER ID | POSITIONING POINT ID | TRAJECTORY ID | POSITIONING TIME | LATITUDE | LONGITUDE | ... |
|---|---|---|---|---|---|---|
| 1 | 1 | 1 | 2016.09.01 13:00:00 | 30.1 | 132.46 | ... |
| 1 | 2 | 1 | 2016.09.01 13:05:00 | 30.5 | 132.46 | ... |
| ... | ... | ... | ... | ... | ... | ... |

| DEPARTURE TIME | ARRIVAL TIME | DEPARTURE AREA | ARRIVAL AREA | NUMBER OF PEOPLE | ... |
|---|---|---|---|---|---|
| 01:00 | 02:00 | 1 | 2 | 10 | ... |
| 01:00 | 02:00 | 1 | 3 | 25 | ... |
| ... | ... | ... | ... | ... | ... |

| AREA ID | SIZE | UPPER LEFT CORNER LATITUDE | UPPER LEFT CORNER LONGITUDE | ... |
|---|---|---|---|---|
| 1 | 100 m SQUARE | 30.1 | 132.46 | ... |
| 2 | 100 m SQUARE | 30.5 | 132.46 | ... |
| ... | ... | ... | ... | ... |

| AREA ID | DESTINATION PROBABILITY | ... |
|---------|------------------------|-----|
| 1 | 0.1 | ... |
| 2 | 0.25 | ... |
| ... | ... | .. |

| MOVING SPEED (m/s) | $\alpha$ (PENALTY FOR ERROR IN MOVING DIRECTION) |
|---|---|
| 1 | 1 |
| ... | ... |

| MOVING MEANS | ELAPSED TIME FROM MOVING START (MINUTES) | $\lambda$ (PARAMETER OF EXPONENTIAL FUNCTION) |
|---|---|---|
| WALKING | 5 | 0.5 |
| TRAIN | 5 | 0.2 |
| ... | ... | ... |

| AREA ID | DESTINATION TREND PARAMETER | ... |
|---|---|---|
| 1 | 10 | ... |
| 2 | 25 | ... |
| ... | ... | .. |

384

| ATTENUATION PARAMETER | SCORE | ... |
|---|---|---|
| β | 10 | ... |
| ... | ... | .. |

386

| AREA ID | POINT-OF-DEPARTURE TREND PARAMETER | ... |
|---|---|---|
| 1 | 10 | ... |
| 2 | 25 | ... |
| ... | ... | .. |

38

DEVICE, METHOD, AND PROGRAM FOR PREDICTING DESTINATION

CROSS-REFERENCE TO RELATED APPLICATIONS

This application is a U.S. 371 Application of International Patent Application No. PCT/JP2019/051266, filed on 26 Dec. 2019, which application claims priority to and the benefit of JP Application No. 2019-001825, filed on 9 Jan. 2019, the disclosures of which are hereby incorporated herein by reference in their entireties.

TECHNICAL FIELD

The disclosed technology relates to a destination prediction device, method and program, and more particularly, to a destination prediction device, method and program that predicts a destination of a user on the move.

BACKGROUND ART

Due to the widespread use of smart devices with a GPS (global positioning system) or the like, movement trajectory information is increasingly collected now. A "movement trajectory" is a set of positioning points defined as a set of three elements: time, latitude and longitude. There is a need to estimate a destination of a user on the move using movement trajectories. Services such as presenting the user information about the vicinity of the destination or the like ahead of time are made possible by estimating the destination.

A conventional destination prediction technique learns a user's past movement trajectories in advance and uses the learning result to estimate a destination to which the user is more likely to move based on a current movement trajectory. For example, a technique that divides a space into grids, estimates a movement probability between neighboring grids based on past movement trajectories of the estimation target user and predicts the destination from the current movement trajectory based on the estimation result is being proposed (see Non-Patent Literature 1). Another technique that models a user's past movement trajectories using an LSTM (long short-term memory) and predicts a destination from a current movement trajectory is being proposed (see Non-Patent Literature 2). A further technique that learns movement trajectories of all users together is being proposed (see Non-Patent Literature 3).

CITATION LIST

Non-Patent Literature

Non-Patent Literature 1: Takimoto et al., "Personalized Destination Prediction Considering Time Zone", Proceedings of IEICE (The Institute of Electronics, Information and Communication Engineers), 2017.
Non-Patent Literature 2: Y. Endo et al, "Predicting Destinations from Partial Trajectories Using Recurrent Neural Network", Proc. of PAKDD, 2017.
Non-Patent Literature 3: Andy Yuan Xue et al, "Destination Prediction by Sub-Trajectory Synthesis and Privacy Protection Against Such Prediction", Proc. of ICDE, 2013.

SUMMARY OF THE INVENTION

Technical Problem

However, since the prior arts use information on a user's past movement trajectories, if no information on the relevant user's past movement trajectories is present or when the relevant user is moving to a site unvisited in the past or the like, the user's destination cannot be predicted. Although there are prior arts that learn movement trajectories of all users together, since the movement trajectories are personal information, using movement trajectories of other users to predict a destination of a certain user may often be difficult and information on movement trajectories of other users may not always be used.

However, there are many cases where users want to predict destinations in situations while no information on movement trajectories is available such as movements to places that users visit for the first time, like tourist attractions or users' movements for which the users have just started to use new services.

The disclosed technology has been implemented in view of the above circumstances, and it is an object of the present invention to provide a destination prediction device, method and program that allow even users who have no information on past movement trajectories to predict their destinations.

Means for Solving the Problem

In order to attain the above described object, a destination prediction device according to the disclosed technology is constructed by including a personal remaining movement estimation unit that estimates information relating to remaining movement of a user on the move based on a movement trajectory of the user on the move and a personal destination estimation unit that predicts a destination of the user on the move based on information estimated by the personal remaining movement estimation unit, and at least one of information indicating a movement trend among spots of a plurality of users and information related to the information indicating the movement trend.

According to the destination prediction device according to the disclosed technology, the personal remaining movement estimation unit estimates the information relating to the remaining movement of the user on the move based on the movement trajectory of the user on the move, and the personal destination estimation unit predicts the destination of the user on the move based on the information estimated by the personal remaining movement estimation unit, and at least one of the information indicating the movement trend among the spots of the plurality of users and the information related to the information indicating the movement trend. This allows even users who have no information on past movement trajectories to predict their destinations.

The personal remaining movement estimation unit can be constructed by including a personal remaining moving direction estimation unit that estimates a trend of remaining moving direction of the user on the move based on the moving direction indicated by the movement trajectory and a personal remaining moving distance estimation unit that estimates a remaining moving distance of the user on the move based on at least one of a moving time to the present indicated by the movement trajectory, a current moving speed and moving means. This makes it possible to accurately estimate information relating to the remaining movement of the user on the move.

The personal remaining movement estimation unit can estimate, based on past movement trajectories of a plurality of users, information relating to remaining movement of the user on the move using a personal remaining movement trend model obtained by learning a relationship between movement trajectory to midway and a trend of the remaining movement. It is thereby possible to accurately estimate information relating to the remaining movement of the user on the move.

The personal destination estimation unit can predict the destination of the user on the move based on information indicating how easily each spot will be a destination according to movement trends of a plurality of users as the information related to the information indicating the movement trend. This allows even users having no information on past movement trajectories to predict their destinations.

The personal destination estimation unit can further predict the destination of the user on the move based on past movement trajectories of the user on the move. Thus, for a user whose information on past movement trajectories exists, it is possible to predict a destination corresponding to the user's characteristics.

A destination prediction method according to the disclosed technology is a method including a personal remaining movement estimation unit estimating information relating to remaining movement of a user on the move based on a movement trajectory of the user on the move, and a personal destination estimation unit predicting a destination of the user on the move based on information estimated by the personal remaining movement estimation unit, and at least one of information indicating a movement trend among spots of a plurality of users and information related to the information indicating the movement trend.

A destination prediction program according to the disclosed technology is a program for causing a computer to function as the respective components that constitute the above destination prediction device.

Effects of the Invention

As described above, the destination prediction device, method, and program according to the disclosed technology predict a destination of a user on the move based on information relating to remaining movement estimated based on a movement trajectory of the user on the move, and at least one of information indicating a movement trend among spots of a plurality of users and information related thereto, and it is thereby possible to predict a destination even for a user having no information on past movement trajectories.

BRIEF DESCRIPTION OF DRAWINGS

FIG. 3 is a diagram illustrating an example of a personal movement trajectory storage unit.

FIG. 4 is a diagram illustrating an example of a movement trend information storage unit.

FIG. 10 is a diagram illustrating an example of the personal remaining movement trend model storage unit.

FIG. 14 is a diagram illustrating an example of a movement trend related information storage unit.

DESCRIPTION OF EMBODIMENTS

Hereinafter, embodiments for implementing the disclosed technology will be described in detail with reference to the accompanying drawings.

Overview of Embodiments

An overview of embodiments will be described before describing the following embodiments in detail.

Figure 1:
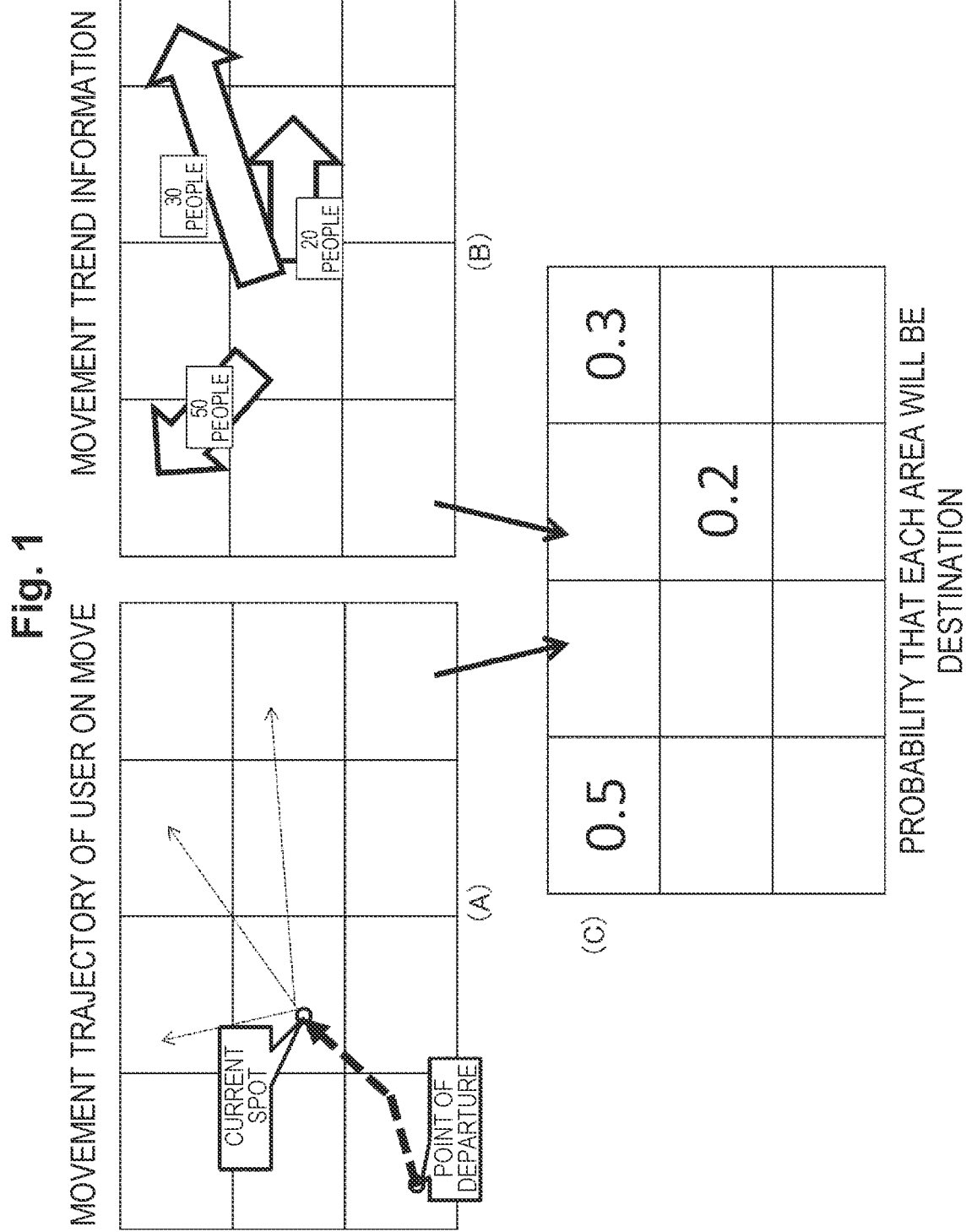
FIG. 1 is a diagram for describing an overview of an embodiment.

As shown in FIG. 1(A), in an embodiment according to the disclosed technology, information relating to remaining movement (hereinafter referred to as "remaining movement") (dotted-line arrows in FIG. 1) is first estimated based on a movement trajectory (broken-line arrow in FIG. 1) to the present of a user on the move. Next, as shown in FIG. 1(C), a destination is predicted by combining the movement trend information shown in FIG. 1(B) and information relating to the estimated remaining movement.

The movement trend information is information recording, when a space is divided into a plurality of areas, the number of people who have moved from a certain area to another area for a certain period. For example, such a format is used that the number of people who have moved from an area near Yokohama Station to an area near Tokyo Station during a period from 9:00 am to 10:00 am is x and the number of people who have moved to an area near Shinagawa Station is y. Such movement trend information has fewer privacy-related problems than movement trajectory of each user, which is personal information, and so, the movement trend information is becoming widespread. There is also a technique that estimates movement trend information from a population distribution at each time in each area (Reference Literature: Y. Akagi et al, "A Fast and Accurate Method for Estimating People Flow from Spatiotemporal Population Data", Proc. of IJCAI, 2018).

In this way, in the embodiment according to the disclosed technology, a destination of a user having no information on past movement trajectories or a user moving to a destination unvisited in the past is predicted using estimation results of remaining movements estimated from the movement trajectories and movement trend information.

A case will be described in the following embodiments where as shown in FIG. 1, a space is divided into a plurality of areas and a probability that each area will be a destination is estimated to thereby predict the destination. The destination prediction device according to each embodiment may be mounted as an application on a smart device or the like provided with a GPS function and possessed by the user or may be constructed of a server device or the like communicable with the smart device or the like possessed by the user via a network. The latter case will be described in the present embodiment.

First Embodiment

A destination prediction device according to a first embodiment is constructed as a computer provided with a CPU (central processing unit), a RAM (random access memory), a ROM (read only memory) and an HDD (hard disk drive) or the like. The ROM stores a destination prediction program according to the present embodiment. Note that the destination prediction program may be stored in the HDD.

The destination prediction program may be installed in advance in the destination prediction device. This destination prediction program may also be implemented by storing it in a non-volatile storage medium or distributing it to the destination prediction device via a network and installing it as appropriate. Note that examples of the non-volatile storage medium include a CD-ROM (compact disc read only memory), a magneto-optical disk, a DVD-ROM (digital versatile disc read only memory), a flash memory or a memory card.

The CPU functions as each functional unit of the destination prediction device, which will be described later, by reading and executing the destination prediction program stored in the ROM.

Figure 2:
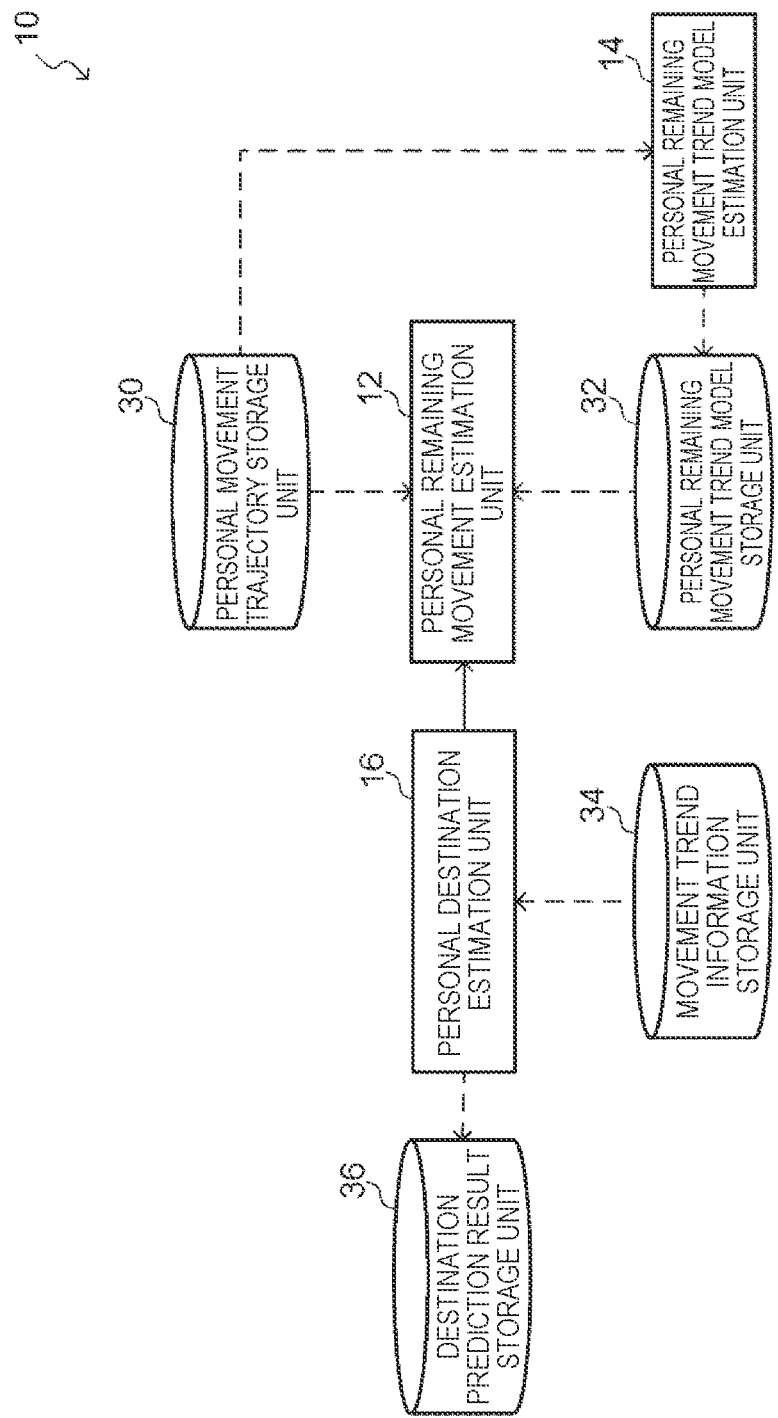
FIG. 2 is a functional block diagram of a destination prediction device according to a first embodiment.

As shown in FIG. 2, a destination prediction device 10 according to the first embodiment functionally includes a personal remaining movement estimation unit 12, a personal remaining movement trend model estimation unit 14, a personal destination estimation unit 16, a personal movement trajectory storage unit 30, a personal remaining movement trend model storage unit 32, a movement trend information storage unit 34 and a destination prediction result storage unit 36. Note that a solid-line arrow in FIG. 2 denotes a relationship of calling a function and broken-line arrows denote a relationship of data reading. The same will apply to FIG. 7, FIG. 13 and FIG. 16, which will be described later.

The personal movement trajectory storage unit 30 stores information on personal movement trajectories of each user. FIG. 3 illustrates an example of movement trajectories stored in the personal movement trajectory storage unit 30. In the example in FIG. 3, each row (each record) corresponds to positioning information at one positioning point. Each piece of positioning information includes a "user ID", which is identification information of a user, "positioning point ID" which is identification information of the positioning point, "trajectory ID" which is identification information of a movement trajectory and information such as "positioning time", "latitude" and "longitude." Regarding the positioning information having the same user ID, time-series data made up of a positioning information group having the same trajectory ID arranged in order of positioning times is a movement trajectory of the user indicated by the user ID.

For example, positioning information positioned by a GPS function of a smart device possessed by each user is transmitted from the smart device to the destination prediction device 10 successively or at a predetermined time interval and stored in the personal movement trajectory storage unit 30.

The personal remaining movement estimation unit 12 acquires movement trajectory, which is time-series data of positioning information having a user ID of a user on the move as a destination prediction target (hereinafter referred to as a "target user") from the personal movement trajectory storage unit 30. The personal remaining movement estimation unit 12 estimates what type of movement the target user performs from here until reaching the destination based on the acquired movement trajectory and the personal remaining movement trend model stored in the personal remaining movement trend model storage unit 32. The personal remaining movement estimation unit 12 delivers the estimation result of the remaining movement and information on the current spot of the target user to the personal destination estimation unit 16. Note that the current spot of the target user can be identified as a latitude and a longitude included in the positioning information, the positioning time of which is latest, of the positioning information included in the movement trajectory of the target user.

The personal remaining movement trend model estimation unit 14 learns a relationship between past movement trajectories of a plurality of users and remaining movements, and estimates a personal remaining movement trend model. For example, the personal remaining movement trend model estimation unit 14 considers a set of movement trajectories of the plurality of users to midway and areas including the destination corresponding to the movement trajectories as learning data and learns a personal remaining movement trend model that outputs a probability that each area will be a destination in response to inputs of the movement trajectories. The personal remaining movement trend model estimation unit 14 stores the estimated personal remaining movement trend model in the personal remaining movement trend model storage unit 32.

The movement trend information storage unit 34 stores movement trend information, which is data recording the number of people moving between two areas in a certain time zone for a combination of each time zone and each area. The movement trend information may be an aggregate of actual movement trajectories acquired by a GPS or the like or estimation results from population distribution data using the technique described in the above Reference Literature or the like. FIG. 4 illustrates an example of the movement trend information storage unit 34. In the example in FIG. 4, the movement trend information storage unit 34 stores a movement trend information table 342 and an area information table 344.

The movement trend information table 342 stores the "number of people" who have moved from a "departure area" to an "arrival area" for a period from a "departure time" to an "arrival time" as movement trend information. An area ID, which is identification information of the area is stored in each of the "departure area" and the "arrival area."

The area information table 344 stores area information including information of "area ID," "size," "upper left corner latitude" and "upper left corner longitude" for each area. The present embodiment describes a case where space is divided into cells, that is, a case where each area is a rectangle, and the "size" stands for longitudinal and horizontal distances of the rectangular area. The "upper left corner latitude" and the "upper left corner longitude" stand for reference positions of each area. Note that the reference positions are not limited to this example, but may be other positions such as a center or upper right corner of the area.

Area IDs stored in the "departure area" and the "arrival area" of the movement trend information table 342 correspond to "area IDs" in the area information table 344.

The personal destination estimation unit 16 estimates a probability that each area will be a destination based on an estimation result of a remaining movement of a target user delivered from the personal remaining movement estimation unit 12 and movement trend information stored in the movement trend information storage unit 34.

More specifically, the personal destination estimation unit 16 identifies an area including the current spot of the target user based on the latitude and longitude indicating the current spot of the target user and the area information stored in the area information table 344. From the movement trend information table 342, the personal destination estimation unit 16 reads the number of people moving to each area in the movement trend information according to which a difference between the "departure time" and the current time falls within a predetermined time and the "departure area" is an area including the current spot of the identified target user. The first embodiment multiplies a probability that each area will be a destination estimated as the remaining movement by the number of moving people indicated by the movement trend information to calculate as a final probability that each area will be a destination.

This technique will be described using an expression. When the area of the current spot of the target user is an area i, the personal destination estimation unit 16 calculates a moving probability $\theta_{ij}$ from the area i to an area j as shown in following Expression (1).

[Math. 1]

$$\theta_{ij} = \frac{M_{ij}}{\sum_{k \in A} M_{ik}} \times N_j \quad (1)$$

Here, "A" represents a list of all areas and "$M_{ij}$" represents the number of people moving from the area i to the area j in the corresponding time zone read from the movement trend information table 342. "$N_j$" represents an estimation result delivered from the personal remaining movement estimation unit 12 and is a probability that the area j will be a destination.

Figures 5, 6:
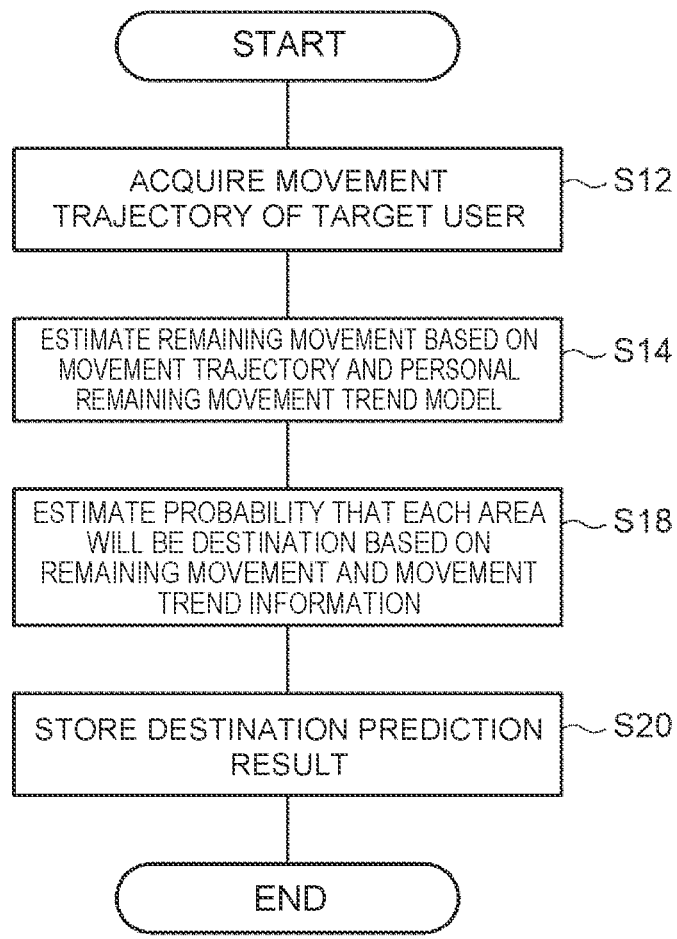
FIG. 5 is a diagram illustrating an example of a destination prediction result storage unit.
FIG. 6 is a flowchart illustrating an example of a processing flow according to a destination prediction program according to the first embodiment.

As shown in FIG. 5, the personal destination estimation unit 16 associates a final probability of becoming a destination (hereinafter also referred to as "destination probability") $\theta_{ij}$ calculated for each area with an area ID of each area, and stores the final probability in the destination prediction result storage unit 36.

Next, operation of the destination prediction device 10 according to the first embodiment will be described.

The personal remaining movement trend model estimation unit 14 estimates a personal remaining movement trend model using the movement trajectories of the plurality of users stored in the personal movement trajectory storage unit 30 and stores the personal remaining movement trend model in the personal remaining movement trend model storage unit 32. When execution of a destination prediction process on the target user is instructed, the destination prediction device 10 executes the destination prediction process as shown in FIG. 6. Note that FIG. 6 is a flowchart illustrating an example of a processing flow according to a destination prediction program according to the first embodiment.

In step S12, the personal remaining movement estimation unit 12 acquires a movement trajectory, which is time-series data of positioning information having a user ID of the target user from the personal movement trajectory storage unit 30.

Next, in step S14, the personal remaining movement estimation unit 12 estimates the remaining movement of the target user based on the acquired movement trajectory and the personal remaining movement trend model stored in the personal remaining movement trend model storage unit 32. The personal remaining movement estimation unit 12 delivers the estimation result of the remaining movement and information on the current spot of the target user to the personal destination estimation unit 16.

Next, in step S18, the personal destination estimation unit 16 estimates a probability that each area will be a destination according to, for example, Expression (1) based on the estimation result of the remaining movement of the target user delivered from the personal remaining movement estimation unit 12 and the movement trend information stored in the movement trend information storage unit 34.

Next, in step S20, the personal destination estimation unit 16 stores the prediction result of the destination, which is the probability that each area will be a destination associated with the area ID of each area in the destination prediction result storage unit 36, and the destination prediction processing ends.

As described above, the destination prediction device according to the first embodiment estimates a probability that each area will be a destination based on the estimation result of the remaining movement based on the movement trajectory, and the movement trend information and stores (outputs) the probability as the prediction result of the destination. Therefore, it is possible to predict a destination of even a user having no information on past movement trajectories. In this way, it is possible to predict a destination of a user who has just started to use the service or a user who has visited a place such as a tourist attraction for the first time, and thereby upgrade services associated with various geographical information.

Use of movement trend information is highly safe in terms of personal information compared to a case where information on movement trajectories of other users is used.

Second Embodiment

Next, a second embodiment will be described. In the second embodiment, a moving direction and a moving distance from now on will be estimated as information relating to remaining movement of a target user.

Note that a hardware configuration of the destination prediction device according to the second embodiment is similar to the hardware configuration of the destination prediction device 10 according to the first embodiment, and so description thereof will be omitted. In the destination prediction device according to the second embodiment, the same components and processes as those in the destination prediction device 10 according to the first embodiment are assigned the same reference numerals and detailed description thereof will be omitted.

Figure 7:
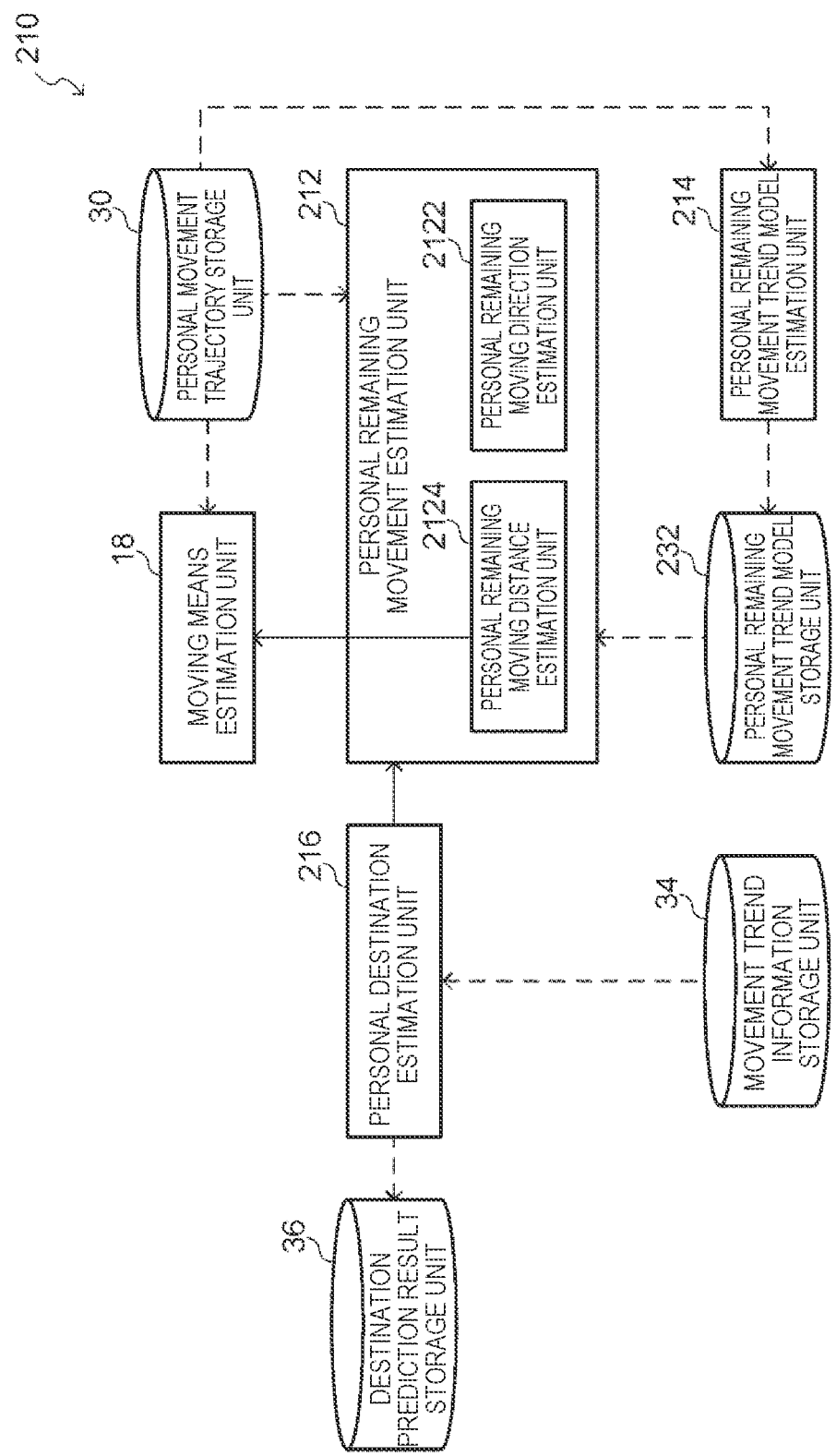
FIG. 7 is a functional block diagram of a destination prediction device according to a second embodiment.

As shown in FIG. 7, a destination prediction device 210 according to the second embodiment functionally includes a personal remaining movement estimation unit 212, a personal remaining movement trend model estimation unit 214, a moving means estimation unit 18, a personal destination estimation unit 216, the personal movement trajectory storage unit 30, a personal remaining movement trend model storage unit 232, the movement trend information storage unit 34 and the destination prediction result storage unit 36.

The personal remaining movement estimation unit 212 incorporates a personal remaining moving direction estimation unit 2122 and a personal remaining moving distance estimation unit 2124.

The personal remaining moving direction estimation unit 2122 estimates, based on a moving direction indicated by a movement trajectory of a target user, a trend of a remaining moving direction of the target user, that is, regarding the remaining movement, which direction the user is likely to take (hereinafter referred to as a "remaining moving direction").

Figure 8:
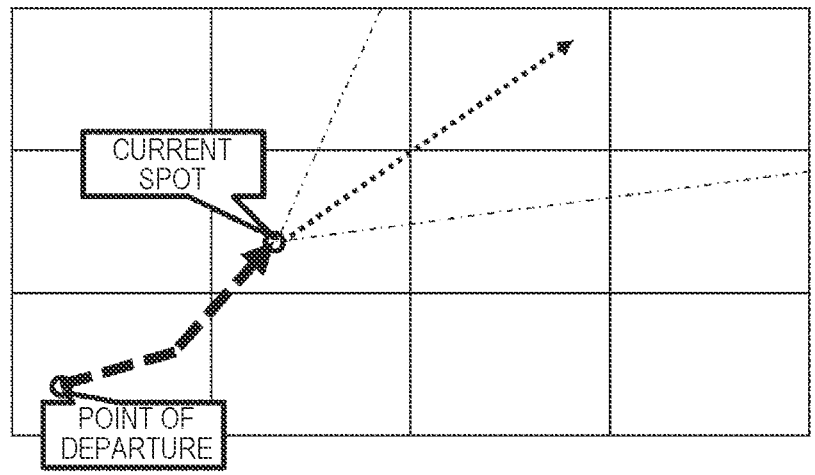
FIG. 8 is a diagram for describing estimation of a remaining moving direction.

More specifically, the personal remaining moving direction estimation unit 2122 estimates, based on current or past moving direction as shown in FIG. 8, a remaining moving direction (dotted-line arrow in FIG. 8) and tolerance for a deviation from the direction (range indicated by single-dot dashed lines in FIG. 8) and outputs the remaining moving direction and the tolerance. Regarding the remaining moving direction, a direction of a straight line drawn from a positioning point immediately before a most recent positioning point among movement trajectories can be taken as an output example. The tolerance for the deviation may be, for example, a constant α when it is assumed that a probability that a certain area j will be a destination is calculated according to the following expression using a vector $\vec{ij}$ connecting an area i at the current spot and the area j and a predicted remaining moving direction A. The constant α represents a penalty for the moving direction being different from the estimation result. The notation "$x(\rightarrow)$" represents "vector x" in the present Description.

$$(\vec{A} \cdot \vec{ij})^{\alpha} \quad [\text{Math. 2}]$$

Figure 9:
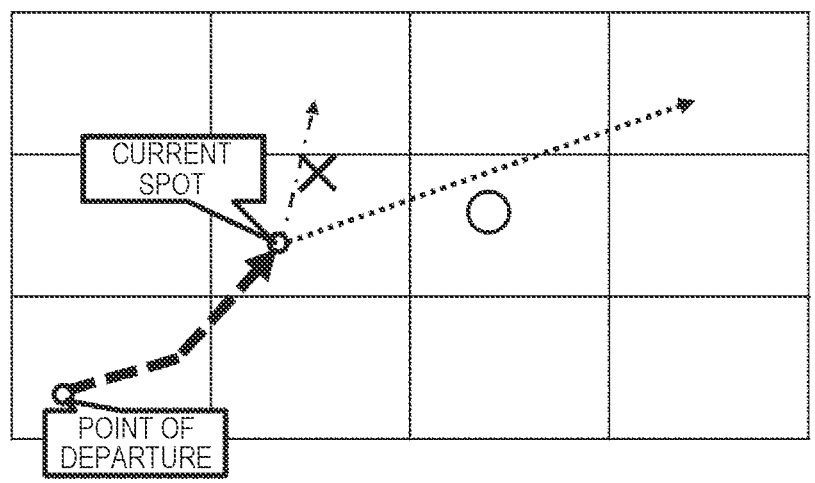
FIG. 9 is a diagram for describing estimation of a remaining moving distance.

The personal remaining moving distance estimation unit 2124 estimates a remaining moving distance of a target user (hereinafter referred to as a "remaining moving distance") based on at least one of a moving time to the present indicated by a movement trajectory, a current moving speed and moving means. For example, as shown in FIG. 9, when the moving time so far is short, there is a high possibility that the moving time from now on will increase, and there is a trend that the remaining moving distance will also increase. When the current moving speed is fast, the remaining moving distance tends to increase compared to the case where the current moving speed is slow. During traveling by train or by car, the remaining moving distance tends to increase compared to the case where moving means is walking. The personal remaining moving distance estimation unit 2124 estimates the remaining moving distance using such a trend.

More specifically, the personal remaining moving distance estimation unit 2124 estimates what the remaining moving distance is likely to be based on the current speed, the elapsed time so far and the current moving means estimated using the moving means estimation unit 18, which will be described later. For example, the personal remaining moving distance estimation unit 2124 classifies cases by current speed, elapsed time or moving means, and can read, for each case, a probability distribution as to what the distance from the current spot to the destination is likely to be from the personal remaining movement trend model storage unit 232, which will be described later, and output the probability distribution. An output example can be parameters of a probability density distribution or the like with respect to the remaining moving distance d. An example of parameters of the probability density distribution can be a parameter λ or the like when the probability density distribution is formulated with an exponential function of $\lambda e^{-\lambda e}$.

The personal remaining movement estimation unit 212 delivers outputs of the personal remaining moving direction estimation unit 2122 and the personal remaining moving distance estimation unit 2124 to the personal destination estimation unit 216.

As in the case of the personal remaining movement trend model estimation unit 14 of the first embodiment, the personal remaining movement trend model estimation unit 214 learns a relationship between the past movement trajectories of the plurality of users and the remaining movements, and estimates a personal remaining movement trend model.

For example, when the personal remaining moving direction estimation unit 2122 estimates a remaining moving direction based on the current moving direction and moving speed, the personal remaining movement trend model estimation unit 214 of the second embodiment estimates a personal remaining movement trend model that outputs a parameter indicating a degree of deviation from the estimated remaining moving direction that can be tolerated in accordance with the moving speed (penalty for an error). For example, when the personal remaining moving distance estimation unit 2124 estimates the remaining moving distance based on the moving means and the elapsed time from the moving start, the personal remaining movement trend model estimation unit 214 estimates a personal remaining movement trend model that outputs a distribution type of the probability distribution of the remaining moving distance for each moving means and each elapsed time and a parameter.

The personal remaining movement trend model estimation unit 214 stores the estimated parameter of the personal remaining movement trend model in the personal remaining movement trend model storage unit 232. FIG. 10 illustrates parameter examples of the personal remaining movement trend model stored in the personal remaining movement trend model storage unit 232. In the examples in FIG. 10, the personal remaining movement trend model storage unit 232 stores a parameter 2322 relating to estimation of a moving direction and a parameter 2324 relating to estimation of a moving distance.

Figure 11:
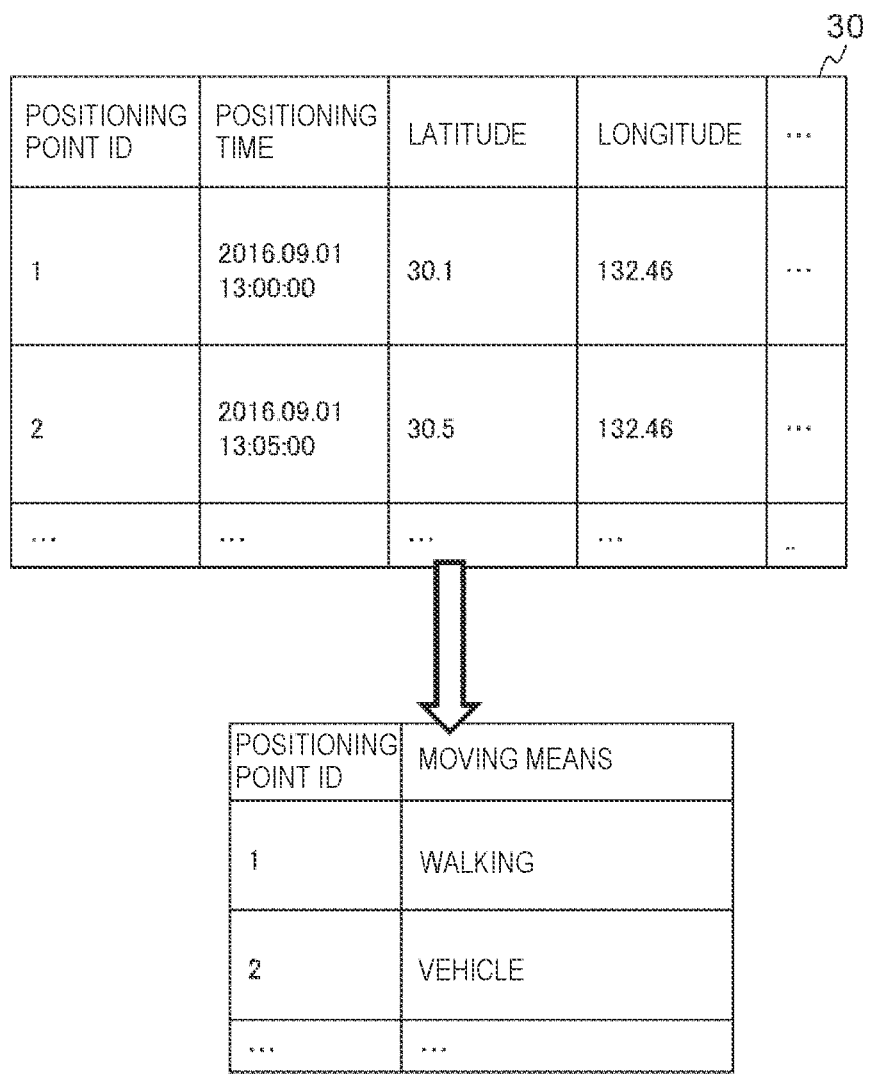
FIG. 11 is a diagram illustrating input/output examples of the moving means estimation unit.

The moving means estimation unit 18 acquires a movement trajectory of a target user from the personal movement trajectory storage unit 30, estimates moving means (walking, train, car or the like) of each part of the movement trajectory and outputs the estimation results. For example, the moving means estimation unit 18 estimates the moving means using the moving speed indicated by the movement trajectory, results of mapping to a roadmap, a route map or the like. FIG. 11 illustrates input/output examples of the moving means estimation unit 18.

The personal destination estimation unit 216 estimates a probability that each area will be a destination based on the estimation results of the remaining movement relating to the moving direction and the moving distance for the target user delivered from the personal remaining movement estimation unit 212 and the movement trend information stored in the movement trend information storage unit 34.

More specifically, the personal destination estimation unit 216 reads the number of people moving from the current spot of the target user to each area from the movement trend information storage unit 34 and calculates a probability that each area will be a destination so as to be proportional to values of corrections made for the respective areas using the estimation results of the personal remaining moving direction estimation unit 2122 and the personal remaining moving distance estimation unit 2124.

This technique will be described using an expression. When the area of the current spot of the target user is an area i, the personal destination estimation unit 216 calculates a probability Oil of moving from the area i to the area j as shown in following Expression (2).

[Math. 3]

$$\theta_{ij} = \frac{\left(\vec{A} \cdot \vec{ij}\right)^\alpha \times \beta(dist(i, j)) \times M_{ij}}{\sum_{k \in A} \left(\vec{A} \cdot \vec{ik}\right)^\alpha \times \beta(dist(i, k)) \times M_{ik}} \quad (2)$$

Here, $\vec{A}$ is a unit vector indicating a direction estimated as the remaining moving direction outputted by the personal remaining moving direction estimation unit 2122, and $\vec{ij}$ represents a vector connecting the area i and the area j. Furthermore, dist(i, j) represents a distance between the area i and the area j, $\beta(d)$ represents a probability of the remaining moving distance of the target user being d, and is a value obtained from a probability density distribution represented by an exponential function formulated by a parameter λ outputted from the personal remaining moving distance estimation unit 2124. Furthermore, α is a parameter outputted from the personal remaining moving direction estimation unit 2122, is a weight of a penalty for the moving direction being different from the estimation result, and a prediction result shows that the greater the value of a, the more likely it is for an area located near the estimated moving direction to be a destination. $M_{ij}$ is similar to that in Expression (1) in the first embodiment.

Next, operation of the destination prediction device 210 according to the second embodiment will be described.

Figure 12:
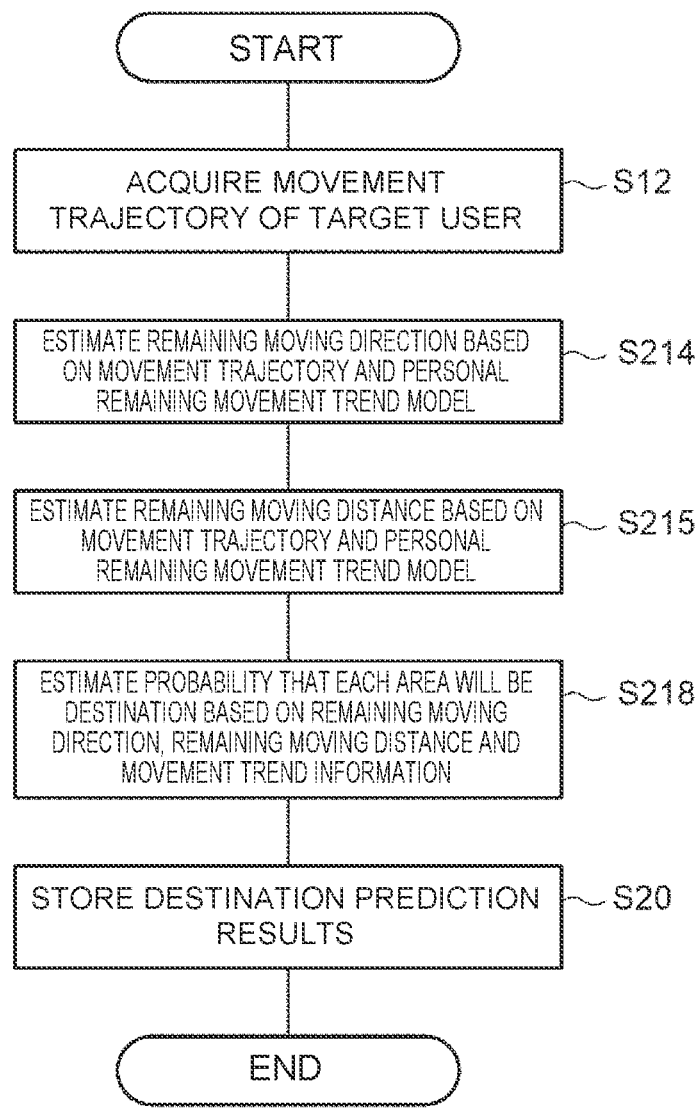
FIG. 12 is a flowchart illustrating an example of a processing flow according to a destination prediction program according to the second embodiment.

The personal remaining movement trend model estimation unit 214 estimates a personal remaining movement trend model using the movement trajectories of the plurality of users stored in the personal movement trajectory storage unit 30 and stores the personal remaining movement trend model in the personal remaining movement trend model storage unit 232. When execution of a destination prediction process for a target user is instructed, the destination prediction device 210 executes a destination prediction process shown in FIG. 12. Note that FIG. 12 is a flowchart illustrating an example of the processing flow according to the destination prediction program according to the second embodiment.

In step S12, the personal remaining movement estimation unit 212 acquires a movement trajectory of the target user from the personal movement trajectory storage unit 30.

Next, in step S214, the personal remaining moving direction estimation unit 2122 estimates a remaining moving direction based on the movement trajectory and acquires a parameter a indicating a penalty for an error in the moving direction corresponding to the moving speed indicated by the movement trajectory from the personal remaining movement trend model storage unit 232. The personal remaining moving direction estimation unit 2122 outputs the estimated remaining moving direction and the acquired parameter a.

Next, in step S215, the personal remaining moving distance estimation unit 2124 calls the moving means estimation unit 18 and acquires the moving means estimation result based on the movement trajectory. The personal remaining moving distance estimation unit 2124 acquires a parameter λ indicating a probability density distribution corresponding to the remaining moving distance according to the elapsed time from the moving start indicated by the movement trajectory and the moving means from the personal remaining movement trend model storage unit 232. The personal remaining moving distance estimation unit 2124 outputs the acquired parameter λ.

Next, in step S218, the personal destination estimation unit 216 acquires the number of people $M_{ij}$ moving from the area i including the current spot of the target user to each area j in the corresponding time zone from the movement trend information storage unit 34. The personal destination estimation unit 216 calculates a distance dist(i, j) from the area i to each area j. The personal destination estimation unit 216 estimates a probability that each area will be a destination using the acquired number of moving people $M_{ij}$, the calculated distance dist(i, j), the unit vector $\vec{A}$ indicating the remaining moving direction outputted in step S214 above, parameter a and the parameter λ outputted in step S215 above according to Expression (2), for example.

Next, in step S20, the personal destination estimation unit 216 stores the destination prediction results in the destination prediction result storage unit 36 and the destination prediction process ends.

As described above, the destination prediction device according to the second embodiment performs estimation relating to the moving direction and estimation relating to the moving distance as estimations of remaining movements based on the moving trajectories. This makes it possible to accurately estimate the remaining movement and improve accuracy of destination prediction.

Third Embodiment

Next, a third embodiment will be described. In the third embodiment, a destination is predicted also using a parameter indicating how easily each area will be a destination.

Note that since a hardware configuration of the destination prediction device according to the third embodiment is similar to the hardware configuration of the destination prediction device 10 according to the first embodiment, description thereof will be omitted. In the destination prediction device according to the third embodiment, the same components and processes as those in the destination prediction device 210 according to the second embodiment are assigned the same reference numerals and detailed description thereof will be omitted.

Figure 13:
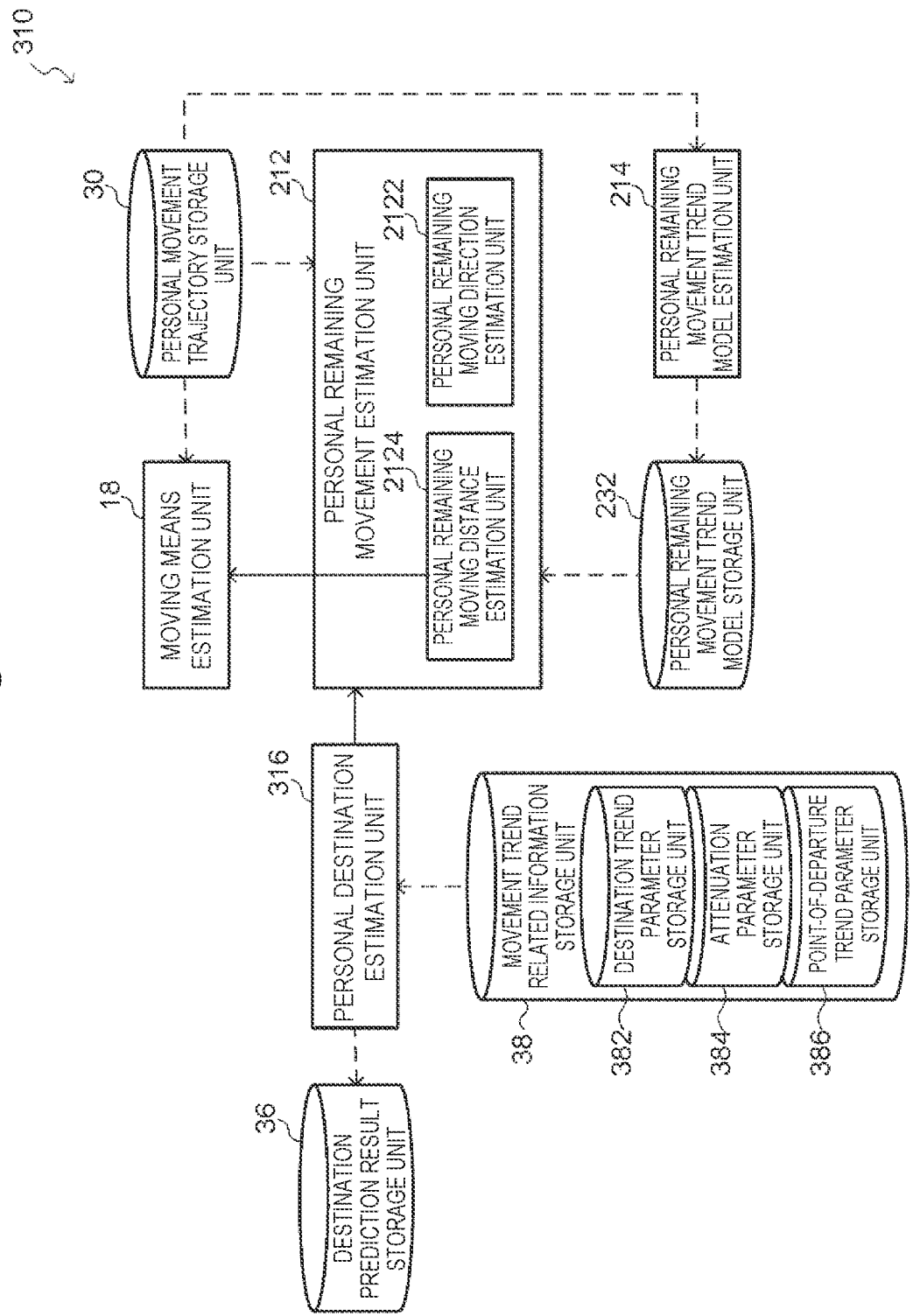
FIG. 13 is a functional block diagram of a destination prediction device according to a third embodiment.

As shown in FIG. 13, a destination prediction device 310 according to the third embodiment functionally includes the personal remaining movement estimation unit 212, the personal remaining movement trend model estimation unit 214, the moving means estimation unit 18, a personal destination estimation unit 316, the personal movement trajectory storage unit 30, the personal remaining movement trend model storage unit 232, a movement trend related information storage unit 38 and the destination prediction result storage unit 36.

The movement trend related information storage unit 38 stores data relating to movement trend information. More specifically, the movement trend related information storage unit 38 includes a destination trend parameter storage unit 382 that stores a parameter indicating how easily each area will be a destination, an attenuation parameter storage unit 384 that stores a parameter indicating a magnitude of distance attenuation of a probability of moving from each area to another area and a point-of-departure trend parameter storage unit 386 that stores a parameter indicating how easily a person departs from each area. Such data is given in a data format obtained in an estimation process in the above technique described in the Reference Literature that estimates movement trend information from population distribution data. The data can also be calculated from the actual movement trend information. FIG. 14 illustrates an example of the movement trend related information storage unit 38.

The personal destination estimation unit 316 estimates a probability that each area will be a destination based on an estimation result of remaining movement relating to each of a moving direction and a moving distance of a target user delivered from the personal remaining movement estimation unit 212 and information stored in the movement trend related information storage unit 38.

More specifically, in the second embodiment, the personal destination estimation unit 316 uses a value $S_1$ indicating how easily each area j will be a destination obtained from the movement trend related information instead of the number of people moving from the area i acquired from the movement trend information to the area j in the corresponding time zone.

This technique will be described using an expression. When the area of the current spot of a target user is an area i, the personal destination estimation unit 316 calculates a probability Oil of moving from the area i to the area j as shown in Expression (3) below.

[Math. 4]

$$\theta_{ij} = \frac{\left(\vec{A} \cdot \vec{ij}\right)^{\alpha} \times \beta(dist(i,j)) \times S_j}{\sum_{k \in A} \left(\vec{A} \cdot \vec{ik}\right)^{\alpha} \times \beta(dist(i,k)) \times S_k} \quad (3)$$

Here, $S_j$ is a value indicating how easily the area j will be a destination calculated using a parameter for the area j acquired from the destination trend parameter storage unit 382, the attenuation parameter storage unit 384 and the point-of-departure trend parameter storage unit 386. Note that as $S_1$, only the value stored in the destination trend parameter storage unit 382 may be used. The other symbols in Expression (3) have the same meanings as those in Expression (2) in the second embodiment.

Next, operation of the destination prediction device 310 according to the third embodiment will be described.

Figure 15:
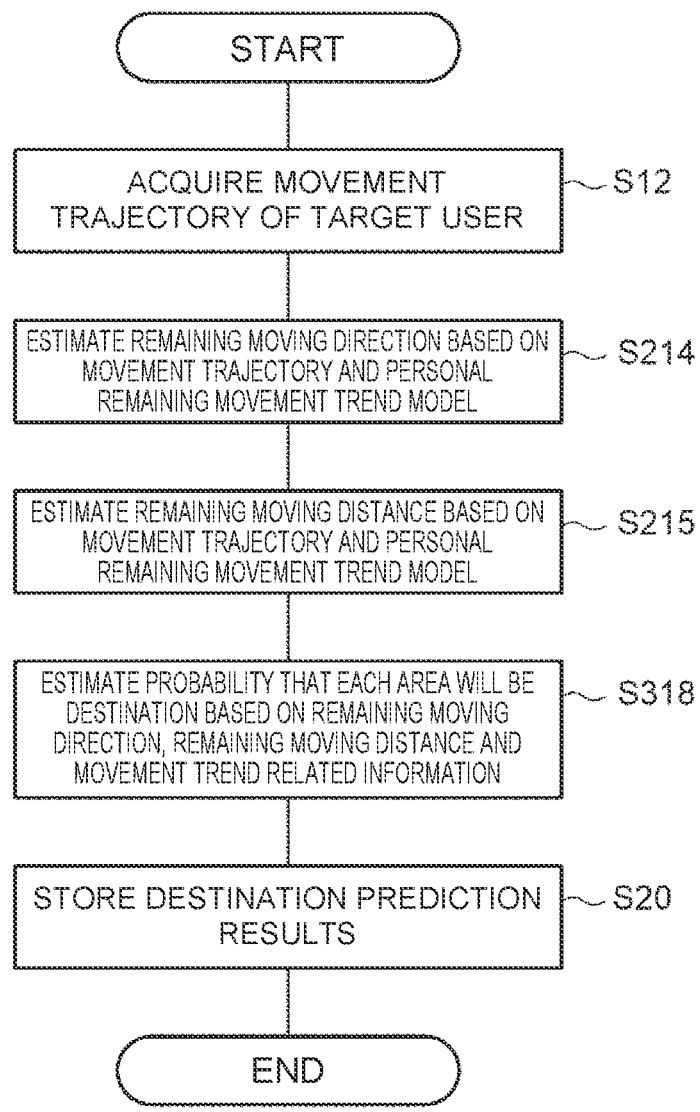
FIG. 15 is a flowchart illustrating an example of a processing flow according to a destination prediction program according to the third embodiment.

If execution of a destination prediction process for a target user is instructed while a personal remaining movement trend model is stored in the personal remaining movement trend model storage unit 232, the destination prediction device 310 executes the destination prediction process shown in FIG. 15. Note that FIG. 15 is a flowchart illustrating an example of a processing flow according to a destination prediction program according to the third embodiment.

After steps S12, S214 and S215, in next step S318, the personal destination estimation unit 316 calculates a value $S_1$ indicating how easily the area j will be a destination using the parameter for the area j acquired from the destination trend parameter storage unit 382, the attenuation parameter storage unit 384 and the point-of-departure trend parameter storage unit 386. The personal destination estimation unit 316 estimates a probability that each area will be a destination from Expression (3), for example.

Next, in step S20, the personal destination estimation unit 316 stores destination prediction results in the destination prediction result storage unit 36, and the destination prediction process ends.

As described above, the destination prediction device according to the third embodiment can estimate a probability that each area will be a destination based on the remaining movement estimation result based on a movement trajectory, and related information of the movement trend information and stores (outputs) the probability as a destination prediction result. This makes it possible to exert effects similar to the effects in the first and second embodiments.

Note that although a case has been described in the third embodiment where related information of the movement trend information is used instead of the movement trend information, the destination may be predicted using both the movement trend information and the related information of the movement trend information. In this case, for example, Expression (3) may be multiplied by $M_{ij}$ in Expression (2) in the second embodiment to calculate Oil.

Fourth Embodiment

Next, a fourth embodiment will be described. In the fourth embodiment, a final prediction result is outputted by combining a destination prediction result using the above movement trend information and a destination prediction result based on a history of personal movement trajectories seen in the prior arts.

Note that since a hardware configuration of the destination prediction device according to the fourth embodiment is similar to the hardware configuration of the destination prediction device 10 according to the first embodiment, description thereof will be omitted. In the destination prediction device according to the fourth embodiment, the same components and processes as those in the destination prediction device 210 according to the second embodiment are assigned the same reference numerals and detailed description thereof will be omitted.

Figure 16:
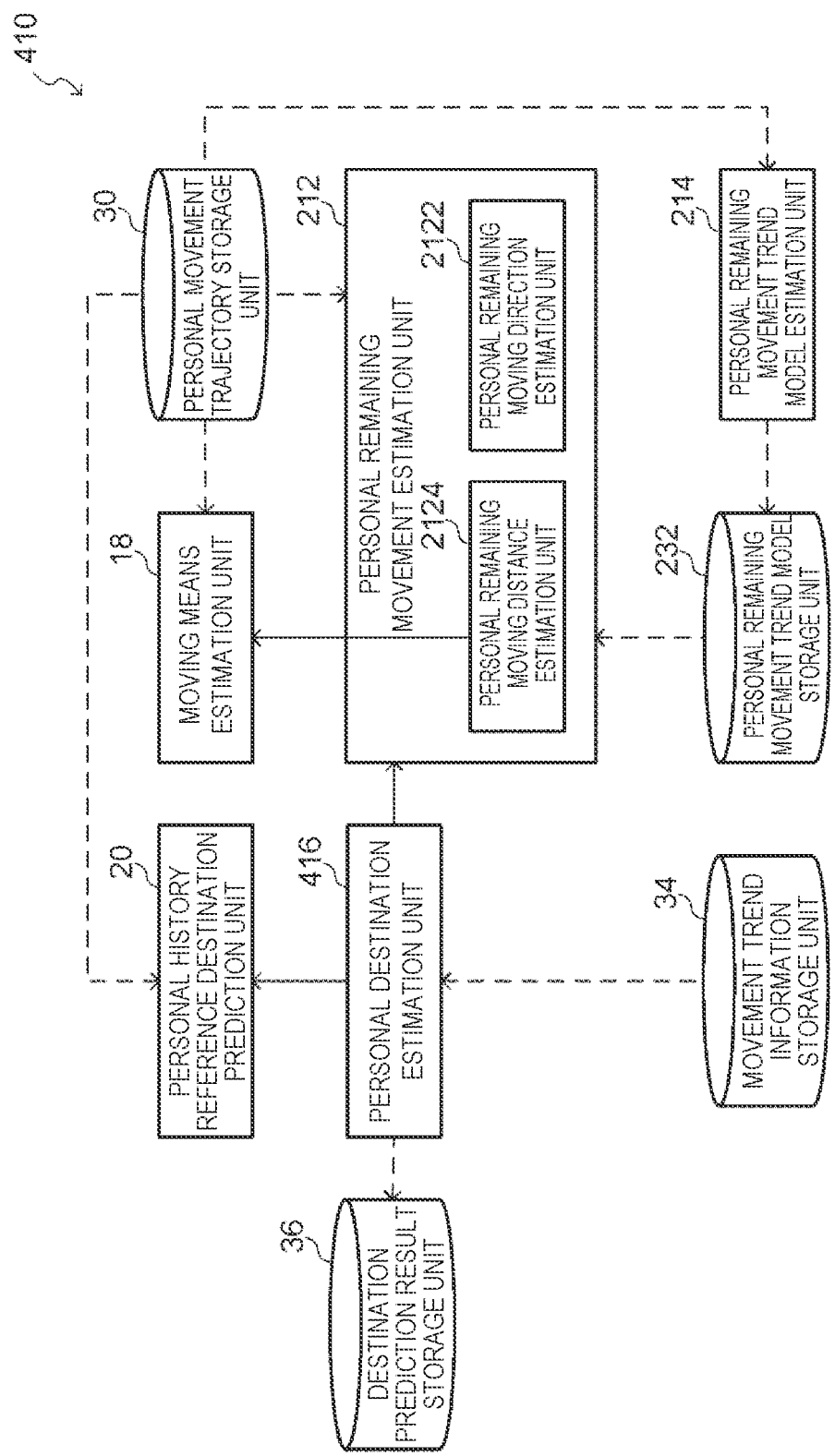
FIG. 16 is a functional block diagram of a destination prediction device according to a fourth embodiment.

As shown in FIG. 16, a destination prediction device 410 according to the fourth embodiment functionally includes the personal remaining movement estimation unit 212, the personal remaining movement trend model estimation unit 214, the moving means estimation unit 18, a personal history reference destination prediction unit 20, a personal destination estimation unit 416, the personal movement trajectory storage unit 30, the personal remaining movement trend model storage unit 232, the movement trend information storage unit 34 and the destination prediction result storage unit 36.

Figure 17:
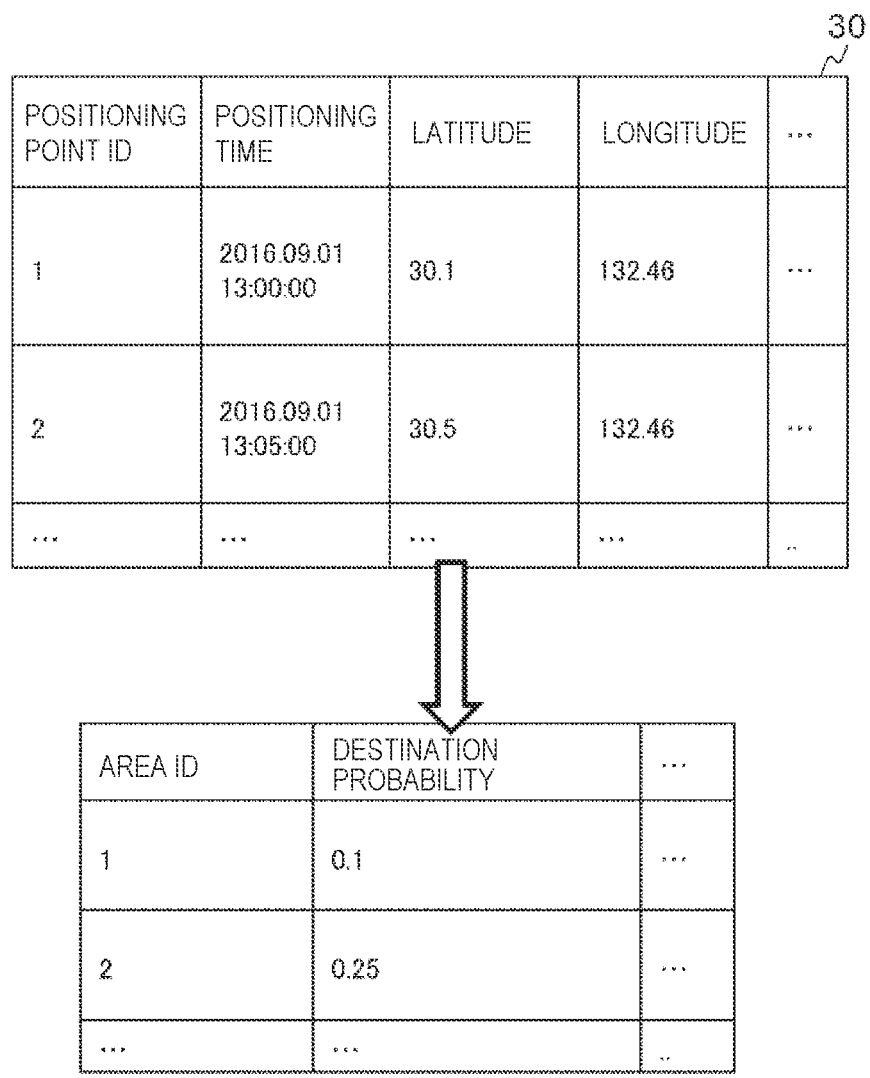
FIG. 17 is a diagram illustrating input/output examples of a personal history reference destination prediction unit.

The personal history reference destination prediction unit 20 predicts a destination based on a personal history of past movement trajectories of a target user. The personal history reference destination prediction unit 20 predicts a destination using existing techniques described, for example, in Non-Patent Literature 1 or 2. FIG. 17 illustrates input/output examples of the personal history reference destination prediction unit 20.

The personal destination estimation unit 416 estimates a probability that each area will be a destination based on estimation results of the remaining movements relating to the moving direction and the moving distance of the target user delivered from the personal remaining movement estimation unit 212, movement trend information stored in the movement trend information storage unit 34 and the prediction results outputted from the personal history reference destination prediction unit 20.

For example, the personal destination estimation unit 416 estimates a probability that each area will be a destination so as to be proportional to a value obtained by multiplying, for each area, $\theta_{ij}$ calculated in the same way as the personal destination estimation unit 216 of the second embodiment by the probability that each area will be a destination, which is the prediction result outputted from the personal history reference destination prediction unit 20.

Next, operation of the destination prediction device 410 according to the fourth embodiment will be described.

Figure 18:
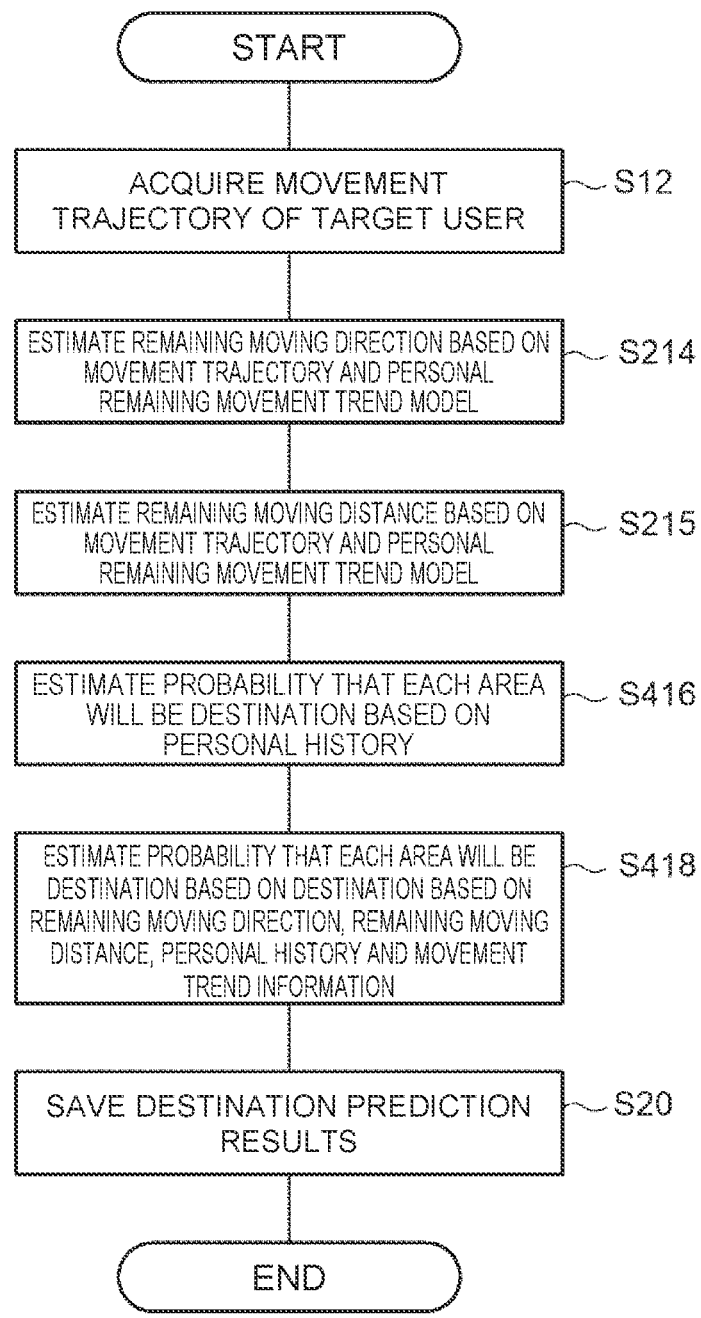
FIG. 18 is a flowchart illustrating an example of a processing flow according to a destination prediction program according to the fourth embodiment.

When a destination prediction process for a target user is instructed while the personal remaining movement trend model is stored in the personal remaining movement trend model storage unit 232, the destination prediction device 410 executes the destination prediction process shown in FIG. 18. Note that FIG. 18 is a flowchart illustrating an example of a processing flow according to a destination prediction program according to the fourth embodiment.

After steps S12, S214 and S215, in next step S416, the personal history reference destination prediction unit 20 estimates a probability that each area will be a destination based on a history of personal past movement trajectories of the target user and outputs the probability.

Next, in step S418, the personal destination estimation unit 416 estimates a final probability that each area will be a destination by multiplying the probability that each area will be a destination calculated according to, for example, Expression (2) using the estimation result of the remaining moving direction, the estimation result of the remaining moving distance and the number of people moving between areas obtained from movement trend information by the probability that each area will be a destination outputted from the personal history reference destination prediction unit 20.

Next, in step S20, the personal destination estimation unit 416 stores the destination prediction results in the destination prediction result storage unit 36 and the destination prediction process ends.

As described so far, the destination prediction device according to the fourth embodiment estimates a probability that each area will be a destination using also a history of personal past movement trajectories of a target user, and can thereby predict a destination for a user having a history of movement trajectories according to the user's characteristics.

Note that although a case has been described in the fourth embodiment where a history of personal past movement trajectories of a target user is also used in addition to the second embodiment, the history of personal past movement trajectories may be applied to the first or third embodiment as well.

Note that various components and processes of the destination prediction device described in the above embodiments are examples, and may be changed depending on situations without departing from the spirit and scope of the present invention.

The processing flow of the program described in the above embodiments is also an example, and unnecessary steps may be deleted or new steps may be added or processing order may be switched without departing from the spirit and scope of the present invention.

Although a case has been described in the above embodiments where processes according to the above embodiments are implemented by a software configuration using a computer, the present invention is not limited to this. The embodiments may also be implemented, for example, by a hardware configuration or a combination of a hardware configuration and a software configuration.

REFERENCE SIGNS LIST 10, 210, 310, 410 destination prediction device
12, 212 personal remaining movement estimation unit
2122 personal remaining moving direction estimation unit
2124 personal remaining moving distance estimation unit
14, 214 personal remaining movement trend model estimation unit
16, 216, 316, 416 personal destination estimation unit
18 moving means estimation unit
20 personal history reference destination prediction unit
30 personal movement trajectory storage unit
32, 232 personal remaining movement trend model storage unit
34 movement trend information storage unit
342 movement trend information table
344 area information table
36 destination prediction result storage unit
38 movement trend related information storage unit
382 destination trend parameter storage unit
384 attenuation parameter storage unit
386 point-of-departure trend parameter storage unit

The invention claimed is:

1. A destination prediction device comprising a processor configured to execute operations comprising:
    estimating information of remaining movement of a user moving according to a movement trajectory of the user using a personal remaining movement trend model, wherein the personal remaining movement trend model predicts the remaining movement of the user based on learning a relationship between the remaining movement of the user and the movement trajectory of the user; and
    predicting a destination of the user based on a combination including the estimated information and, as a correction to the estimated information, at least one of first information indicating a movement trend according to locations of a plurality of users or second information related to the information indicating the movement trend.

2. The destination prediction device according to claim 1, wherein
    the predicting further comprises:
    estimating a trend of remaining moving direction of the user on the move based on a moving direction indicated by the movement trajectory; and
    estimating a remaining moving distance of the user on the move based on at least one of a moving time to the present indicated by the movement trajectory, a current moving speed and a type of the movement.

3. The destination prediction device according to claim 1, wherein the estimating further comprises estimating, based on past movement trajectories of a plurality of users, information relating to remaining movement of the user on the move using the personal remaining movement trend model obtained by learning a relationship between movement trajectory to midway and a trend of the remaining movement.

4. The destination prediction device according to claim 1, wherein the estimating further comprises predicting a destination of the user on the move based on information indicating how easily each location will be a destination according to movement trends of a plurality of users as the information related to the information indicating the movement trend.

5. The destination prediction device according to claim 1, wherein the estimating further comprises predicting the destination of the user on the move based on information on past movement trajectories of the user on the move.

6. A computer implemented method for predicting a destination, comprising:
   estimating information relating to remaining movement of a user according to a movement trajectory of the user using a personal remaining movement trend model, wherein the personal remaining movement trend model predicts the remaining movement of the user based on learning a relationship between the remaining movement of the user and the movement trajectory of the user; and
   predicting a destination of the user based on a combination including the estimated information and, as a correction to the estimated information, at least one of first information indicating a movement trend according to locations of a plurality of users or second information related to the information indicating the movement trend as a correction to the first information.

7. A computer-readable non-transitory recording medium storing a computer-executable program instructions that when executed by a processor cause a computer to execute operations comprising:
   estimating information of remaining movement of a user moving according to a movement trajectory of the user using a personal remaining movement trend model, wherein the personal remaining movement trend model predicts the remaining movement of the user based on learning a relationship between the remaining movement of the user and the movement trajectory of the user; and
   predicting a destination of the user based on a combination including the estimated information and, as a correction to the estimated information, at least one of first information indicating a movement trend among locations of a plurality of users or second information related to the information indicating the movement trend as a correction to the first information.

8. The destination prediction device according to claim 2, wherein the estimating further comprises estimating, based on past movement trajectories of a plurality of users, information relating to remaining movement of the user on the move using a personal remaining movement trend model obtained by learning a relationship between movement trajectory to midway and a trend of the remaining movement.

9. The destination prediction device according to claim 3, wherein the predicting further comprises predicting a destination of the user on the move based on information indicating how easily each location will be a destination according to movement trends of a plurality of users as the information related to the information indicating the movement trend.

10. The destination prediction device according to claim 2, wherein the predicting further comprises predicting the destination of the user on the move based on information on past movement trajectories of the user on the move.

11. The destination prediction device according to claim 4, wherein the predicting the destination of the user on the move based on information on past movement trajectories of the user on the move.

12. The destination prediction method according to claim 6 wherein the estimating is based, in part, on past movement trajectories of a plurality of users.

13. The destination prediction method according to claim 12 wherein information relating to remaining movement of the user on the move using a personal remaining movement trend model obtained by learning a relationship between movement trajectory to midway and a trend of the remaining movement.

14. The destination prediction method according to claim 12 further comprising:
   predicting a destination of the user on the move based on information indicating how easily each location will be a destination according to movement trends of a plurality of users as the information related to the information indicating the movement trend.

15. A computer implemented method according to claim 6, further comprising:
   estimating a trend of remaining moving direction of the user on the move based on a moving direction indicated by the movement trajectory; and
   estimating a remaining moving distance of the user on the move based on at least one of a moving time to the present indicated by the movement trajectory, a current moving speed and moving means.

\* \* \* \* \*